(12) United States Patent
Vicktorius et al.

(10) Patent No.: US 12,448,167 B2
(45) Date of Patent: Oct. 21, 2025

(54) METHOD FOR OPERATING A LABELLING SYSTEM

(71) Applicant: Espera-Werke GmbH, Duisburg (DE)

(72) Inventors: Winfried Vicktorius, Duisburg (DE); Peter Wolff, Swisttal-Heimerzheim (DE); Ronnie Beckers, Lummen (BE)

(73) Assignee: Espera-Werke GmbH, Duisburg (DE)

( * ) Notice: Subject to any disclaimer, the term of this patent is extended or adjusted under 35 U.S.C. 154(b) by 242 days.

(21) Appl. No.: 18/035,562

(22) PCT Filed: Oct. 21, 2021

(86) PCT No.: PCT/EP2021/079231
§ 371 (c)(1),
(2) Date: May 5, 2023

(87) PCT Pub. No.: WO2022/100980
PCT Pub. Date: May 19, 2022

(65) Prior Publication Data
US 2024/0010380 A1 Jan. 11, 2024

(30) Foreign Application Priority Data
Nov. 12, 2020 (DE) ..................... 10 2020 129 829.3

(51) Int. Cl.
*B65C 9/40* (2006.01)
*B65C 1/02* (2006.01)
(Continued)

(52) U.S. Cl.
CPC ................ *B65C 9/40* (2013.01); *B65C 1/025* (2013.01); *B65C 9/02* (2013.01); *B65C 9/18* (2013.01)

(58) Field of Classification Search
CPC . B65C 9/40; B65C 9/1865–1884; B65C 9/02; B65C 9/18; B65C 9/42; B65C 1/025; B65C 2009/402
(Continued)

(56) References Cited

U.S. PATENT DOCUMENTS

2017/0183117 A1\* 6/2017 Plazonic .................. B65C 9/40

FOREIGN PATENT DOCUMENTS

| DE | 202020101140 U1 | 3/2020 |
| WO | 0006378 A1 | 2/2000 |

OTHER PUBLICATIONS

International Search Report dated Jan. 25, 2022 filed in PCT/PCT/EP2021/079231.

\* cited by examiner

*Primary Examiner* — John L Goff, II
(74) *Attorney, Agent, or Firm* — Rankin, Hill & Clark LLP

(57) ABSTRACT

The invention relates to a method for operating a labelling system for labelling individual packages, wherein the labelling system comprises a labelling device (1) having functional units and a control assembly (11) which, in a labelling routine, controls the functional units in accordance with a control specification. According to the invention, a user query routine is performed by the control assembly (11), in which user query routine a user is prompted by the user interface (13) to input a state relating to a functional aspect of the labelling system and the state subsequently input by the user is detected by the control assembly (11), and the input state is compared with a predefined state by the control assembly (11) and if the input state deviates from the predefined state a response routine is triggered by the control assembly (11), in which response routine a message regarding the input state is transmitted, by the control assembly
(Continued)

Figure 1:
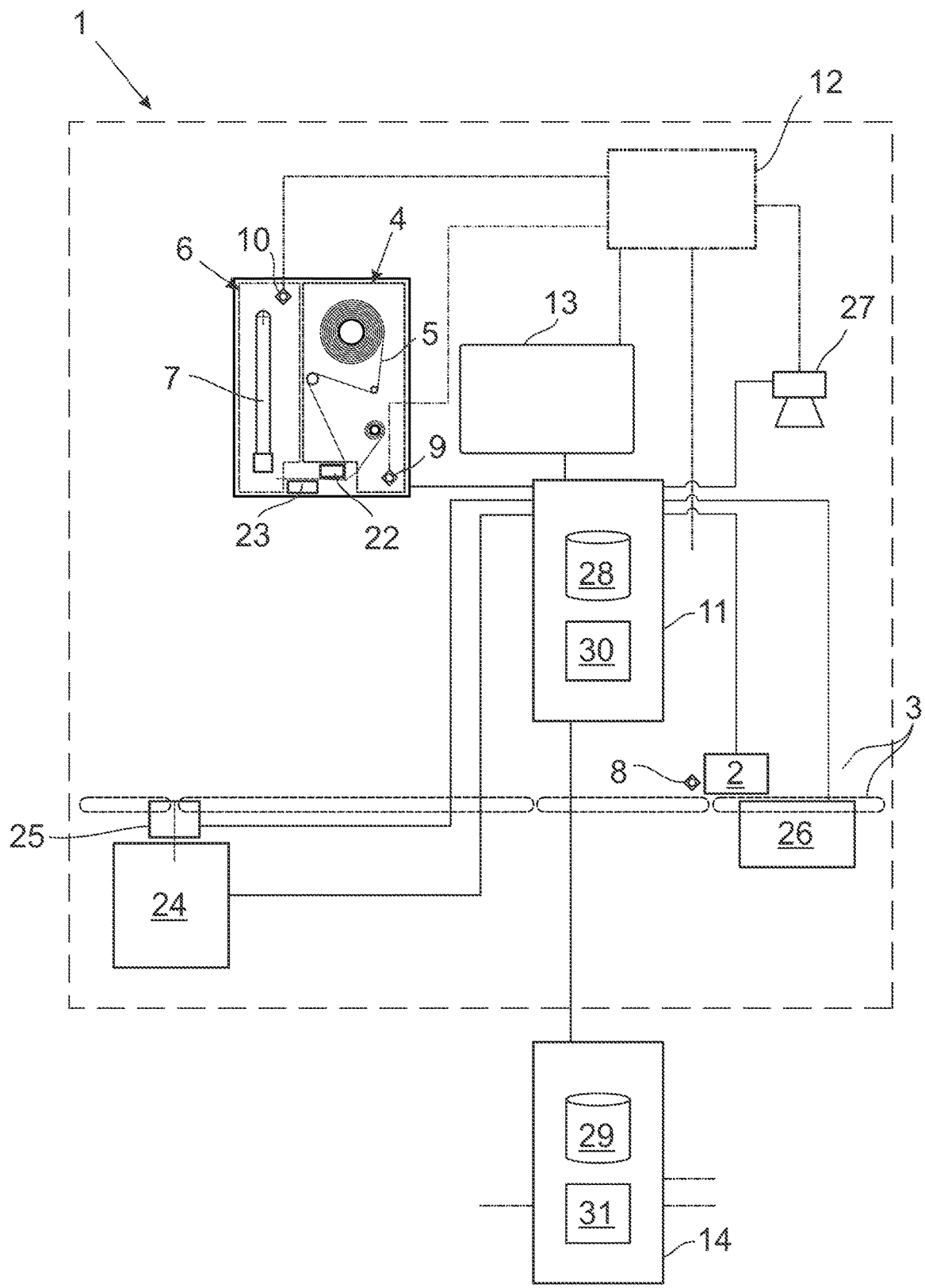

(11), to a control system (14) which is external to the labelling system and superordinate to the control assembly (11), and in which response routine the control specification is modified on the basis of the input state.

38 Claims, 2 Drawing Sheets

(51) Int. Cl.
    *B65C 9/02*     (2006.01)
    *B65C 9/18*     (2006.01)

(58) Field of Classification Search
    USPC .............................. 156/64, DIG. 44, DIG. 45
    See application file for complete search history.

METHOD FOR OPERATING A LABELLING SYSTEM

The invention relates to a method for operating a labeling system for labeling individual packs, a labeling system for labeling individual packs, a system having a control assembly for such a labeling system, and a computer program which causes processors of the labeling system to carry out the method.

The labeling systems in question here for labeling individual packs comprise at least one labeling device, designed in particular as a price labeling device. The labeling device has at least a feed assembly, a dispensing assembly and an application assembly as functional units which are configured for labeling the individual packs in a labeling routine. The functional units are controlled by means of a control assembly in the labeling routine.

In order to ensure reliable and accurate labeling, the functional units have respective sensor assemblies that determine sensor data associated with carrying out the labeling routine. A control assembly of the labeling system performs the control tasks associated with carrying out a labeling routine and controls the functional units for labeling the individual packs in accordance with a control specification. On the basis of the determined sensor data, for example, the position, orientation and speed of the individual packs are ascertained and the application of the labels is controlled.

A problem with the labeling systems in question is that the sensor data allow monitoring of specific faults and fault correction during the control of the function units, but systematic faults which have a long-term impact on the quality of the labeling are often not reliably detected automatically by means of the sensor data in the labeling routine and are not eliminated through adaptation of the control.

The invention is based on the object of indicating a method for operating a labeling system for labeling individual packs, wherein the monitoring of the labeling system is improved.

The above object is achieved in a method as disclosed herein.

An essential aspect is the fundamental notion that systematic errors which are not readily detected by the automatic evaluation of the sensor data are often detected by the human user, but the user is not readily capable of identifying the immediate cause of the fault due to the complexity of the labeling system.

It is specifically proposed that a user query routine is carried out by means of the control assembly, in which user query routine a user, by means of the user interface, is requested to input a state relating to a functional aspect of the labeling system and the state which is then input by the user is captured by the control assembly, that the input state is compared with a predefined state and, in the event of a deviation of the input state from the predefined state, a reaction routine is initiated in which a message relating to the input state is communicated by means of the control assembly to a control system superordinate to the control assembly and configured as external to the labeling system, and in which the control specification is modified depending on the input state.

It has been recognized that, by means of the user query routine, it is easily possible to determine whether there is a defect in the labeling routine, whereupon the reaction routine is used, wherein the control specification can be adapted to eliminate the defect. On the basis of the result of the user query routine, systematic errors are thus detected with high reliability by incorporating the user. In the reaction routine, an adaptation of the control specification can be carried out, in particular manually and/or automatically, in order to clear the fault. The user is preferably supported in the fault location for a manual adaptation.

The advantageous embodiments relate to the modification of the control specification which is further defined depending on the input state. In the particularly expedient embodiment, in which a speed specification is changed and, in particular, reduced, in comparison with a predefined speed specification appertaining to normal operation in order to continue the operation of the labeling system as far as possible.

In the reaction routine, in the particularly preferred embodiment, help information is generated which is used for fault clearance purposes and is forwarded to the user and/or to maintenance personnel so that any required manual intervention in the labeling system is substantially simplified. The automatic generation of a notification, in particular to the manufacturer of the labeling system is similarly advantageous.

Along with the incorporation of the labeling system, the use of the above-discussed external control system also allows the consideration of sensor data of a plurality of labeling systems in the reaction routine so that the overall reliability of the reaction routine is improved.

The generation of a forecast for the need for a repair and/or maintenance of a functional unit is similarly preferred, wherein a reaction to an incipient problem can be enabled even in advance on the basis of the input state. A learning routine on the basis of a temporal sequence of user query routines can particularly preferably be carried out, whereby the large data volume available in particular with a multiplicity of labeling systems is used to optimize the reaction routine, in particular the forecast routine. In the particularly user-friendly embodiment, the user, by means of the user interface, is requested to select the state from a compilation of selectable states. The representation of a rising scale from a low to a high state by the compilation of selectable states simplifies the inputting of the state and the taking account thereof. The user can also simply be requested to input the control specification, the cause of the fault being further narrowed down in order to support the user in the reaction routine.

In order to avoid an incorrect initiation of the reaction routine, in one preferred embodiment, a plausibility check of the input state is carried out by means of the monitoring assembly.

Further functional units of the labeling device are defined in the claims.

Other claims relate to preferred embodiments of the user query routine.

According to a further teaching, this further teaching being accorded independent importance, the above discussed labeling system for labeling individual packs which is configured for carrying out the method according to the proposal is claimed as such. Reference may be made to all explanations concerning the method according to the proposal.

According to a further teaching, this further teaching likewise being accorded independent importance, a system having the above control assembly serving, inter alia, for carrying out the user query routine in the context of the method according to the proposal is claimed as such. Reference may be made to the above explanations concerning the method according to the proposal.

In one advantageous embodiment, the system comprises memories having program instructions and processors for implementing the control in the method according to the proposal.

According to a further teaching, this further teaching likewise being accorded independent importance, a computer program is claimed comprising program instructions which cause the processors of the system according to the proposal to carry out the method according to the proposal when the computer program runs on the processor. In this case, the computer program can be stored on at least one, in particular nonvolatile, memory. In this respect, too, reference may be made to the above explanations concerning the method according to the proposal.

Figure 2:
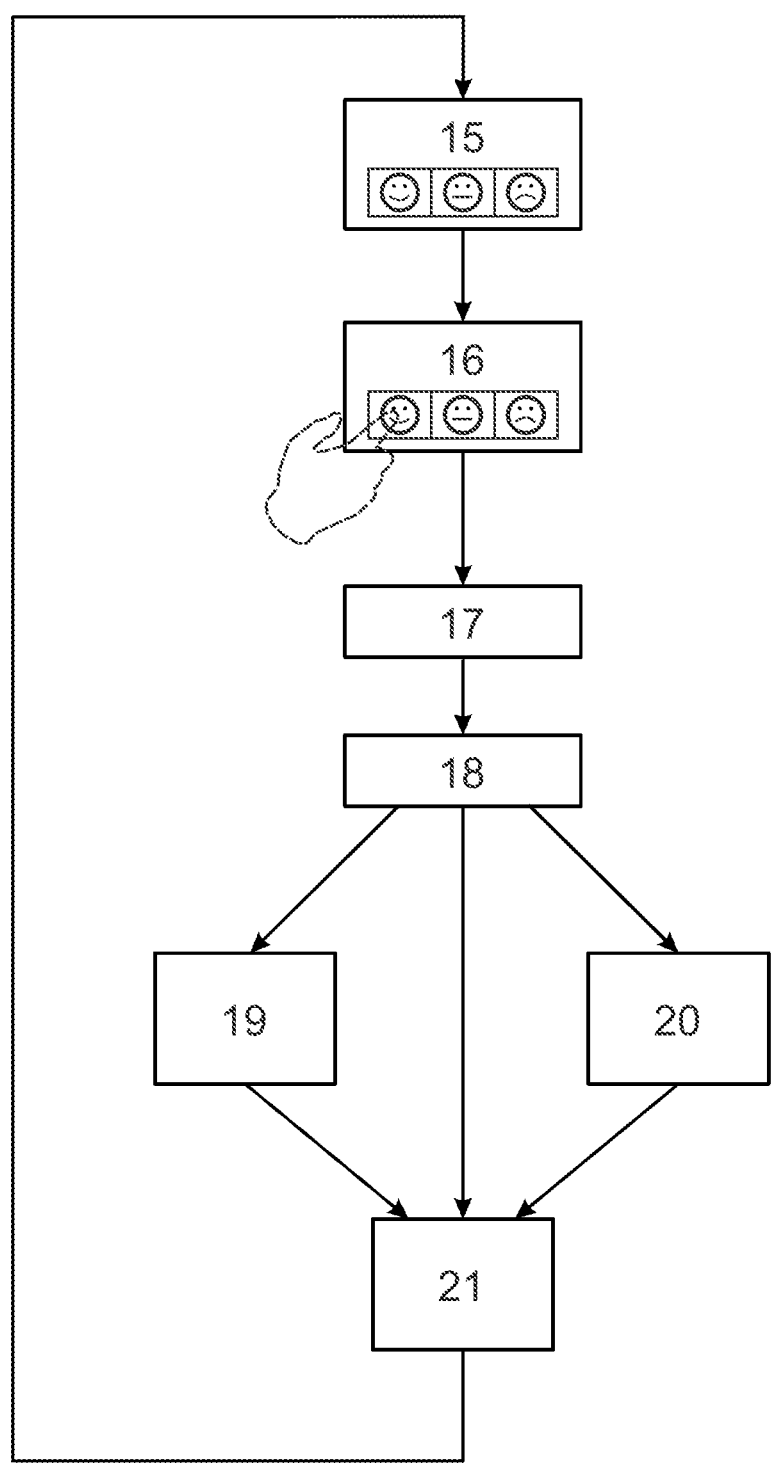

The invention is explained in greater detail below with reference to a drawing illustrating just one exemplary embodiment. In the drawing:

FIG. 1 shows a schematic illustration of the labeling system according to the proposal comprising a control assembly according to the proposal for carrying out the method according to the proposal, and FIG. 2 shows a flow diagram of the method according to the proposal.

The invention relates to a method for operating a labeling system for labeling individual packs. FIG. 1 shows the labeling system in a schematic illustration comprising a labeling device 1 embodied in particular as a price labeling device.

The labeling device 1 is equipped with a feed assembly 2 for transporting respective packs. The feed assembly 2 is preferably a belt conveyor or a roller conveyor, possibly also at least one robot arm, for moving the respective packs. The feed assembly 2, here the belt conveyor, comprises here and preferably at least one transport belt 3, via which the respective packs, not illustrated in FIG. 1, are transported along a transport direction.

Furthermore, a dispensing assembly 4 for dispensing a label detachable from a material strip 5 is provided. A label detachable from a material strip 5 is taken to mean, in particular, a label which is attached by its adhesive surface detachably on a carrier strip which forms the material strip 5 and can consist of paper and/or plastic, for example. It is likewise possible for the label to be produced by separating a partial section from a printable or printed material strip 5, for instance by cutting and/or tearing the material strip 5. The method according to the proposal is preferably applied to labels which are embodied as adhesive labels and which already have an adhesive surface on the material strip 5. The use of adhesive-free labels is likewise conceivable, too, which only later are provided with an adhesive surface or applied to an adhesive surface on the respective pack.

In addition, the labeling device 1, here in a common housing with the dispensing assembly 4, comprises an application assembly 6 for applying the dispensed label to the respective pack. Preferably, the dispensed label is picked up by a punch, which is embodied here and preferably as an oscillating punch 7, and is applied to the respective pack. In particular, the punch comprises a blowing head for sucking up and blowing off the label. During application, the oscillating punch 7 here carries out a movement along the transport direction in order to enable the pack moved by means of the feed assembly 2 to be labeled. By means of the application assembly 6, the label can be applied to the pack with contact by pressing the label thereon. Additionally or alternatively, it is conceivable for the label to be applied without contact, for example by a blowing head of the punch blowing off the label onto the pack by producing a blast of compressed air directed toward the pack.

The feed assembly 2, the dispensing assembly 4 and the application assembly 6 each form functional units of the labeling device 1. Besides the functional units already mentioned, even further functional units can be provided, as will be explained in even greater detail below. Likewise, the labeling system can also comprise a plurality of labeling devices 1, in particular of the kind described here.

At least one or all of the functional units mentioned, that is to say here and preferably at least the feed assembly 2, the dispensing assembly 4 and the application assembly 6, each comprise a sensor assembly 8, 9, 10, which can be used to determine sensor data with regard to carrying out a labeling routine.

The labeling device 1 furthermore comprises a control assembly 11. In the labeling routine, the functional units are controlled by means of the control assembly 11 for the purpose of labeling the individual packs in accordance with a control specification. For this purpose, the control assembly 11 preferably comprises control electronics for implementing the control tasks that arise in the context of the labeling routine. The control assembly 11, as also illustrated in a simplified manner in FIG. 1, can be a central control assembly 11 of the labeling system and/or of the labeling device 1 which controls all or at least a portion of the functional units. It is likewise possible for the control assembly 11 to comprise a plurality of decentralized control units that communicate with one another, a respective control unit preferably being assigned to each functional unit.

The sensor data determined by the respective sensor assemblies 8, 9, 10 are communicated to the control assembly 11 and serve for controlling the functional units in the labeling routine in accordance with the control specification. The control specification contains, inter alia, rules defining how the functional units interwork with one another depending on the available sensor data in order to implement the labeling routine according to the requirements of the user. The control specification can be implemented through software by the control assembly 11. In particular, the control specification contains control parameters which are predefined in order to carry out one or more aspects of the labeling routine and can be modified by the user.

Here, each of the sensor assemblies 8, 9, 10 comprises at least one sensor and preferably a plurality of sensors which determine sensor data for example on the basis of optical, acoustic, mechanical and/or electronic measurement variables. By way of example, the sensors are embodied as temperature sensors and/or as moisture sensors.

Preferably, the sensor assembly 8 of the feed assembly 2 can comprise sensors for determining the transport speed and the rotational speed of the drive assemblies driving the transport belt 3. The dispensing assembly 4 comprises, for example, a sensor assembly 9 having sensors for determining the speed, the length and the current position of the material strip 5. The application assembly 6 comprises, in particular, a sensor assembly 10 for ascertaining the position and orientation of the oscillating punch 7. In respect of further embodiments of the sensor assemblies, reference may be made to measures known to a person skilled in the art for controlling the operation of the functional units of the labeling device 1 in the labeling routine on the basis of sensor technology.

The labeling system comprises here and preferably a monitoring assembly 12. During the labeling routine, the sensor data determined by the sensor assemblies 8, 9, 10 of the functional units are captured in a monitoring routine by means of the monitoring assembly 12. The capture of the sensor data serves here for logging the labeling routine and/or for automatic fault detection in the labeling routine.

The monitoring assembly 12 can be integrated in the control assembly 11. The monitoring assembly 12 can likewise be embodied as a separate assembly that is in communication with the labeling system. The monitoring assembly 12 can be embodied for example as an external assembly that communicates with the labeling system and in particular the sensor assemblies 8, 9, 10 and/or the control assembly 11 via a network.

The labeling system comprises a user interface 13, which is equipped here and preferably with a touchscreen. By way of the user interface 13, it is possible to visualize the control specification, in particular control parameters of the functional units in the labeling routine and, for example, also sensor data or variables derived therefrom for a user of the labeling system. The user can likewise influence the carrying out of the labeling routine, for example, by way of an input by means of the user interface 13, whereby the user at least partially predefines and/or changes the control specification.

What is essential, then, is that a user query routine is carried out by means of the control assembly 11, in which user query routine a user, by means of the user interface 13 of the labeling system, is requested to input a state relating to a functional aspect of the labeling system and the state thereupon input by the user is captured by the control assembly 11, and that the input state is compared with a predefined state by means of the control assembly, and, in the event of a deviation of the input state from the predefined state, a reaction routine is carried out in which a message regarding the input state is communicated by means of the control assembly 11 to a control system 14 which is superordinate to the control assembly 11 and is configured as external to the labeling system, and in which reaction routine the control specification is modified on the basis of the input state.

The control system 14 is, in particular, an external data management assembly, for example a back-end data management assembly, which can also be superordinate to a plurality of control assemblies. "Superordinate" means that the control system 14 can transmit commands and, in particular, the control specification, to the control assembly 11 or to the control assemblies. The control system 14 can also be assigned to a different entity, for example the manufacturer of the labeling system, a maintenance and repair service of the labeling system or the like. "External" means that the control system 14 is designed as separate from the labeling system and, in particular, the control assembly 11, and initiates and/or carries out processes which run at least partially outside the labeling system.

The control assembly 11 is connected to the control system 14, preferably via a communication network which serves to communicate the message. The communication network can be designed as wired and/or wireless and can be implemented, for example, at least partially via the Internet, a telephone network, a mobile radiocommunication network and/or a wide area network (WAN). The message is essentially representative of the input state and at least indicative of the fact that a deviation from the predefined state is present. In particular, the input state per se and/or a variable derived herefrom is communicated to the control system 14. As will be explained below, the message can also contain further data relating to the labeling system and preferably at least parts of the sensor data discussed above FIG. 2 shows a schematic sequence of the method according to the proposal comprising the user query routine and also the reaction routine.

In action 15, a user of the labeling system, by means of the user interface 13, is requested to input a state relating to a functional aspect of the labeling system. "State" is understood to mean a subjective measure of quality regarding a classification of the quality of the work result and/or the process quality in relation to the respective functional aspect.

In action 16, the user inputs the state by means of the user interface 13.

In action 17, the state input by the user is captured by the control assembly 11.

By means of the control assembly 11, in action 18, the state input by the user is compared with a state predefined by the system. The predefined state for the functional aspect concerned is, for example, representative of a course of the labeling routine appertaining to normal operation, and of the fact that, for example, the quality of the work result and/or the process quality in relation to the respective functional aspect corresponds to the expected quality. In this case, the input state need not necessarily be compared with an individual predefined state. Rather, the input state can also be checked in order to ascertain whether it lies within a predefined range of states.

In the reaction routine, along with the message to the control system 14, the control specification is modified depending on the input state, wherein the modification can be carried out automatically, for example by means of the control assembly 11 and/or the control system 14, or at least partially manually, whereby, for example, the control assembly 11 and/or the control system 14 support(s) the user in the modification of the control specification.

In one preferred embodiment, the control specification is modified in the reaction routine depending on whether the input state falls below or exceeds the predefined state. Falling below, on one hand, therefore results in a different modification of the control specification compared with exceeding on the other hand.

In FIG. 2, in response to falling below the predefined state, in action 19, the reaction routine is initiated by means of the control assembly 11. Falling below the predefined state makes it clear, for example, that the quality of the work result and/or the process quality in relation to the respective functional aspect lies below the quality expected by the user.

By contrast, in the flowchart according to FIG. 2, in action 20, in the event of the state being input, the predefined state is exceeded and the control assembly 11 thus recognizes that, by comparison with previously, there is an improved quality of the work result and/or improved process quality in relation to the respective functional aspect. The state predefined by the system in this case is, in particular, the state which was input by the user in a preceding user query routine and which—in a manner expressing the dissatisfaction of the user—was decreased in comparison with an optimum state. By way of example, after the preceding user query routine in which a comparatively low state was input, maintenance or repair work was carried out on the labeling device 1, which has resulted in an improvement in the quality of the work result and/or the process quality in relation to the respective functional aspect. The user is now more satisfied and therefore inputs a state higher than the predefined state. A reaction routine can preferably be initiated here also by means of the control assembly 11.

In one preferred embodiment, in the reaction routine, a degree of the deviation of the input state from the predefined state is determined and the reaction routine, in particular the modification of the control specification, is carried out depending on the degree of the deviation. It is thus possible to take account in the reaction routine of how far removed the instantaneous work result is from a result perceived as optimal by the user.

It is further preferred that the state and, in particular, the degree of the deviation are checked by means of the control assembly 11 and/or the control system 14 in the reaction routine for satisfaction of a predefined urgency criterion. The urgency criterion is a measure indicating whether the further operation of the labeling system is no longer guaranteed without a modification of the control specification. The reaction routine is carried out depending on the satisfaction of the urgency criterion, wherein, if the urgency criterion is satisfied, actions are taken, in particular for protecting the labeling system and/or the individual packs from damage, said actions differing from the actions taken if the urgency criterion is not satisfied, wherein, for example, the modification of the control specification serves only to optimize the labeling routine and/or a notification is generated.

It is further provided here and preferably, particularly in response to a non-satisfaction of the urgency criterion, that the labeling routine is continued after the reaction routine with the modified control specification, in this case for one or more of the functional units, as illustrated in FIG. 2 as action 21. Conversely, in response to satisfaction of the urgency criterion, the further performance of the labeling routine can, for example, be omitted or can be carried out only under further conditions, for example in response to a manual initiation of the labeling routine by the user.

If it is determined with the check on the input state by means of the control assembly 11 in action 18 that the input state corresponds to the predefined optimum state, an initiation of a reaction routine preferably does not happen. The labeling routine can be executed accordingly in action 21, in particular with an unchanged control specification. It is further conceivable that a message is also sent to the control system 14, for example for documentation, even in the event of a correspondence between the input state and the predefined optimum state.

It is conceivable that the control specification is modified for all functions in the reaction routine, for example by predefining modified control parameters for all functional units. However, the modification of the control specification is used, for example, in the event of a deviation of the input state from the predefined state, to adapt the control of the functional unit(s) affected by the functional aspect in a targeted manner. In one embodiment, an assignment of at least one, in particular exactly one, of the functional units to the state on the basis of the functional aspect concerned is provided. The control specification is then modified for the functional aspect concerned, for example by modifying (only) the control parameters of the functional unit affected by the functional aspect.

The user is requested, for example, to input a state relating to a predetermined functional aspect (for example the quality of the application of the label), at least one functional unit being assigned to this predetermined functional aspect (for example the application assembly 4). The assignment to a functional unit arises, in particular, as a result of the causality of the working mode of the respective functional unit for the work result associated with the state and/or as a result of the causality of the working mode of the respective functional unit for the process quality associated with the state. Preferably, the assignment of the input state to at least one, in particular exactly one, of the functional units is already predefined from the outset, that is to say already before the beginning of the user query routine, on the basis of a stipulated assignment specification. However, it is also conceivable for an assignment of the input state to at least one, in particular exactly one, of the functional units to be carried out only in the reaction routine by means of the control assembly 11 and/or by means of the control system 14, preferably also on the basis of a stipulated assignment specification, for example if the state is input in a free input by the user.

In a further embodiment, the labeling system has a plurality of functional units for at least one labeling function, for example a plurality of application assemblies 4. The control specification for the functional aspect concerned can be modified in the reaction routine in such a way that the labeling function is taken over by a further functional unit in the labeling routine. Taking over the labeling function is understood to mean that a further functional unit carries out at least one aspect of the labeling function that was previously carried out by a different functional unit. The application of the labels, for example, which is carried out by a first application assembly before the reaction routine is carried out partially or completely by a second application assembly after the reaction routine.

A plurality of functional resources can similarly be provided for at least one labeling function. The functional resources are understood to mean the basic materials for carrying out the labeling routine, such as, for example, the material strips, printer ink, adhesives or the like. The control specification for the functional aspect concerned is modified in the reaction routine in such way that the labeling routine is carried out using a further functional resource. An alternative material strip, for example, is used with modification of the control specification.

The control specification preferably comprises a speed specification which can, in particular, be a specification for the speed of the individual packs and/or a specification relating to a cyclic or continuous operation of the labeling device. The specification for the speed of the individual packs can relate, for example, to the feed assembly 2. The specification relating to a cyclic or continuous operation can include whether a cyclic operation takes place and/or the timing with which a cyclic operation takes place. The speed specification can, for example, indicate time intervals at which the labeling routine is carried out and/or individual aspects of the labeling routine are carried out.

The speed specification is preferably modified in the reaction routine. If the input state falls below the predefined state, the speed specification can be reduced compared with a speed specification appertaining to normal operation, further preferably while maintaining a minimum speed specification. The labeling routine can be carried out in many cases with an improved result by reducing the speed specification. The minimum speed specification preferably represents a minimum requirement for the throughput of the labeling system and is, for example, representative of a predefined minimum quota of labelled individual packs within a predefined time period.

If the input state exceeds the predefined state, the speed specification can be increased compared with the speed specification appertaining to normal operation so that a higher productivity of the labeling system is achieved. If the input state falls below a minimum state, an emergency stop of the labeling system is further preferably carried out. In this case, the minimum state is representative of a state below which a loss of quality occurs which is unacceptable to the user.

The control specification is preferably modified here at least partially by means of the control system 14, and the control specification is communicated by means of the communication network to the control assembly 11. A modification of the control specification can similarly be requested by means of the control system 14. Help information, in particular help information relating to the use of a tool and/or a replacement part, is preferably generated in the reaction routine by means of the control system 14 on the basis of the input state, in particular on the basis of the assignment of the functional aspect concerned, and the help information is output via the user interface 13 and/or by means of the control system 14 to maintenance personnel for the labeling system. The control system 14 thus initiates a modification of the control specification in that the help information is output and the user and/or the maintenance personnel preferably carry out a repair, servicing and/or maintenance on the basis of the help information. The user and/or maintenance personnel can take targeted action on the basis of the help information.

In the reaction routine, the control assembly 11 can generate a notification, in particular an email notification, to a manufacturer of the labeling system depending on the input state. The notification is, in particular, representative of the input state. The notification is preferably selected from a compilation of predefined notifications depending on the input state. A predefined notification, for example, is assigned in each case to each state and the notification which is assigned to the input state is selected.

The modification of the control specification is preferably determined depending on the sensor data which relate to the labeling routine and which are determined by the sensor assemblies 8, 9, 10. The control assembly 11 and/or the control system 14 can thus carry out an evaluation of the sensor data on the basis of the input state. In particular, compared with fault monitoring carried out by the monitoring assembly 12, alternative sensor data and/or a higher data volume of the sensor data are evaluated here. Along with an evaluation of the instantaneous sensor data, the modification of the control specification can preferably be predefined by means of the control system 14 depending on temporally preceding sensor data stored in the control system 14 in order to improve fault detection and/or fault clearance.

A further improvement in the reaction routine is achieved by predefining the modification of the control specification by means of the control system 14 depending on sensor data relating to the labeling routine from a plurality of labeling systems. The labeling systems are preferably assigned to at least two different entities, in particular different users and/or manufacturers. The control specification can thus be modified on the basis of a comparatively large data volume and also on the basis of a multiplicity of labeling systems operating independently from one another.

A forecast routine in which a forecast is generated for the need for a repair and/or maintenance of a functional unit is particularly preferably carried out by means of the control system 14 in the reaction routine. It is thus estimated on the basis of the input state whether and, in particular when, an impairment of at least one of the function units is to be feared. The forecast can be generated here on the basis of a predefined forecast model depending on the input state and preferably on further parameters which will also be explained below. The forecast is preferably output, for example by means of the user interface 13 and/or by means of the help information, particularly if the forecast meets a predefined output criterion.

A learning routine which serves, in particular, to generate the forecast can be carried out by means of the control system 14. The control specification is modified in the learning routine depending on a temporal sequence of states input in user query routines. The temporal sequence preferably contains at least one state input subsequent to a reaction routine, so that the estimation of the user regarding the effect of the reaction routine is taken into account in the learning routine. The control specification is preferably modified in the learning routine in such a way that, in the event of a deviation of the input state from the predefined input state, the probability of maintaining the predefined input state in a subsequent user query routine is increased.

In the example case where the result of the plurality of temporal sequences in user query routines is negative, for example in that states deviating from the predefined state are frequently input in succession, the design of the reaction routine is clearly unsatisfactory. Consequently, the design of the reaction routine is preferably changed in the learning routine in such a way that the probability of the predefined state being maintained in a subsequent user query routine is increased. Artificial intelligence methods can be used here in the learning routine.

In order to improve the learning routine, the control specification is preferably further modified depending on the respective control specifications of the labeling device, on sensor data relating to the individual packs and/or on environmental parameters of the labeling system. The special requirements of the respective labeling systems can be taken into account by considering the respective control specifications. The environmental parameters are understood to mean parameters relevant to the boundary conditions of the labeling routine, in particular temperature, relative humidity and/or impurity content of the air. The impurity content of the air can be a measure of a corrosive environment of the respective labeling device.

In one preferred, particularly user-friendly embodiment, the user is requested in the user query routine by means of the user interface 13 to select the state from a compilation of selectable states. This affords a particularly intuitive input of the state.

In one embodiment, the compilation of selectable states can represent a rising scale from a low to a high state. A low state expresses a low satisfaction of the user and a high state expresses a high satisfaction of the user. The state can be represented by a numerical value, for example, a low numerical value representing a low state and a high numerical value representing a high state. In the user query routine, the user is requested to input the state on the basis of a selection from the scale. The control specification can thus be predefined in the reaction routine in a particularly simple manner on the basis of the input state, for example the changed sensor specification being determined by way of a mathematical function from the state represented by the numerical value.

In one preferred embodiment, following the input of a state by the user, the user is requested in the reaction routine by means of the user interface 13 to manually modify the control specification, in particular control parameters of at least one functional unit. By means of an input, the user can, for example, influence the extent to which the speed specification is to be increased or decreased. At least one of the functional units is preferably assigned to the input state on the basis of the functional aspect concerned and the assignment is output to the user by means of the user interface 13 so that the functional unit(s) which may have caused the deviation from the predefined state are indicated to the user. Accordingly, a recommendation concerning the parameters which are to be modified can already be provided to the user.

In one preferred embodiment, in the event of a deviation of the input state from the predefined state, a plausibility check of the input state with regard to the presence of at least one predetermined plausibility criterion is carried out by the control assembly 11 and/or the control system 14. A reaction routine is initiated only in the event of a successful plausibility check. By way of a suitable definition of the plausibility criterion, it is possible to recognize an incorrect input of the state in the context of the plausibility check.

In preferred embodiments, the labeling device 1 comprises one or more further functional units, each of which is equipped with a sensor assembly and is controlled by the control assembly 11 in the labeling routine. With regard to the application of these further functional unit(s) and sensor assembly/assemblies in the method according to the proposal, reference should be made to the previous explanations concerning the functional units of feed assembly 2, dispensing assembly 4 and application assembly 6.

Particularly preferably, provision is made of a printer assembly 22 for printing on the label detachable or detached from the material strip 5, wherein printing on the label can be effected in principle on the material strip 5 and/or after the label has been detached from the material strip 5 and before the label is applied to the respective pack. Here and preferably, provision is made of a printer assembly 22 configured for thermal printing. The printer assembly 22 is preferably part of the dispensing assembly 4 and prints on the labels before the latter are dispensed, in particular at an outlet and/or dispensing edge of the dispensing assembly 4. The printer assembly 22 comprises, for example, a dedicated sensor assembly having one or more sensors for monitoring the thermal printer and/or a camera for determining the printed image produced on the labels and/or for image recognition, for example for barcode recognition.

In one preferred embodiment, provision is made of a label transport assembly 23 as a further functional unit of the labeling device 1 for transporting the label from the dispensing assembly 4 to the printer assembly 22 and/or to the application assembly 6. The label transport assembly 23 comprises, for example, a transport belt, in particular a continuous belt, which transports labels from a pick-up region, at which the label is taken from the dispensing assembly 4, to a delivery region, in which the label is fed to the printer assembly 22 or to the application assembly 6. The label transport assembly 23, for example, likewise comprises a dedicated sensor assembly having one or more sensors for determining the speed of the transport belt and/or the position and/or orientation of the labels on the transport belt. In the present case, the label printed on by the printer assembly 22 is dispensed and is fed to the oscillating punch 7 of the application assembly 6 by means of the label transport assembly 23, the application assembly 6 applying the label to a first side of the respective pack.

Here and preferably, a further dispensing and printer assembly 24 is provided. The labels provided by the further dispensing and printer assembly 24 are applied on a second side of the respective pack by a further application assembly 25, said second side here being opposite the first side.

Here and in accordance with a further embodiment, a weighing assembly 26 for weighing the respective pack is provided as yet another functional unit of the labeling device 1. The weighing assembly 26 is configured for determining the weight of individual packs and communicates the determined weight to the control assembly 11, such that, for example, an individual weight labeling and/or individual price labeling can be printed on the label.

In one preferred embodiment, a pack recognition assembly 27 is provided as yet another functional unit of the labeling device 1. The pack recognition assembly 27 comprises a sensor assembly configured to provide sensor data for ascertaining the shape, type, orientation and/or position of the pack. For this purpose, the pack recognition assembly 27 comprises for example at least one camera and preferably at least one 3D camera.

A further example of a functional unit which can be used in the context of the method according to the proposal is a movement assembly for the printing assembly, which, in particular, adjusts the printing assembly transversely with respect to the transport direction of the feed assembly 2. As the functional unit, provision can furthermore be made of an alignment assembly for the packs, for example a centering device for the packs on the feed assembly 2. In accordance with a further embodiment, provision is made of a label press-on assembly, for example a label press-on roller, which acts on the respective label after and/or during application.

In accordance with a further preferred embodiment of the method according to the proposal, it is provided that the input of the state is carried out by means of an input assembly and an output assembly of the user interface 13. The input assembly preferably comprises at least one from a keyboard, touchscreen, mouse and microphone. The output assembly preferably comprises at least one from screen, touchscreen, loudspeaker and printer.

In a further embodiment, the input of the state can be carried out by means of a user interface 13 embodied as a mobile device, which user interface can be provided in addition or as an alternative to a stationary user interface 13 on the labeling system. In this case, a mobile device is understood to mean in particular a cellular phone, a personal digital assistant (PDA), a laptop, a wearable computer and the like. The mobile device can communicate with the control assembly 11 via a network, for example a local network, via a mobile radio network and/or via the Internet.

Carrying out the user query routine can be initiated in a time-controlled manner, in particular cyclically, wherein, for example, stipulated time intervals and/or points in time predefined in a schedule are provided for the user query routine. Additionally or alternatively, the user query routine can be initiated by means of the control assembly 11 and/or the control system 14, for example in response to a predefined fault criterion being satisfied by the sensor signals. In this case, the fault criterion can represent a deviation of the sensor signals from a state of the labeling system appertaining to normal operation. Carrying out the user query routine can likewise be initiated in response to a predefined user action. By way of example, the user query routine is initiated in response to maintenance of the labeling system, renovation of at least parts of the labeling system and/or repair of the labeling system, by means of the control assembly 11 and/or the control system 14, such that a query of the state is effected at points in time with high demand for a process analysis. The user query routine can likewise be initiated manually by the user by means of the user interface 13.

In a further, preferred embodiment, in the user query routine the user is requested to input the state relating to a functional aspect which relates to the printed image of the labels. In particular, the functional aspect furthermore relates to the brightness, the contrast, a print quality and/or the alignment of the printed image on the labels, as a result of which, in particular, an assignment of the functional aspect to at least one functional unit, in particular to the printer assembly 22, can be effected. The print quality is understood to mean, in particular, the accuracy of the reproduction of a printing original by the printed image and/or the number of printing errors. In a further embodiment, the functional aspect relates to the application of the labels on the respective packs, in particular the alignment, position and/or adhesion of the labels. In accordance with a further embodiment, the functional aspect relates to the productivity of the labeling system and, for example, the number of labels applied over a predefined time interval.

In one particularly preferred embodiment, in the user query routine the user is requested to input a plurality of states by way of a hierarchy of queries, at least one subordinate query being assigned to at least one superordinate query in the hierarchy. "Hierarchy of queries" can thus be understood to mean a predefined set of questions for a sequence of queries, in particular the predefinition of a succeeding query being concomitantly determined by the input(s) of the user in response to at least one query made previously. By way of the hierarchy of queries, on one hand a sequence of frequent queries relevant to the respective labeling system can be effected. On the other hand, by way of a targeted sequence of queries, the cause underlying a deviation from the predefined state can be further delimited.

Preferably, on the basis of the hierarchy of queries, at least one functional unit is assigned to the input states. By way of example, in the user query routine firstly the state relating to the print quality is queried. In the event of the input state falling below the predefined state, for example, subsequently a query of the state relating to the brightness, the contrast, the print quality and/or the alignment of the printed image on the labels can be effected in each case. The assignment of the at least one functional unit can be effected depending on the input states.

It is likewise possible for a part of a functional unit to be assigned to a state in the context of the hierarchy of queries.

If falling below the predefined state occurs in respect of the print quality, for example, the printer assembly 22, and in particular the print head of the printer assembly 22, can be assigned to this input state.

It is also possible for a plurality of functional units to be assigned to a state. By way of example, if there is a deviation from the predefined state for the alignment of the printed image on the labels, the printer assembly 22 and the label transport assembly 23 can be assigned to the state.

In a further embodiment, the hierarchy of queries in the user query routine is predefined on the basis of a previously input state. By way of example, firstly further states are queried relating to those functional aspects of which the states in a user query routine executed previously deviated from the respectively predefined state.

In order to increase user-friendliness, in the user query routine the user can be requested to input one state or a plurality of states regarding one functional aspect, a plurality of functional aspects or all functional aspects from an indicated selection of functional aspects.

In order to increase user-friendliness, in one embodiment, in the user query routine for the purpose of inputting the state, the compilation of selectable states is output, in particular visualized, on the basis of an arrangement of selection fields by means of the user interface 13. Preferably, the selection fields are visualized by way of an arrangement along a straight line, a circle or part of a circle, in particular a semicircle, by means of the user interface. The selection fields are accordingly displayed on a screen for simple identification by the user. In order to increase user-friendliness, the selection fields of the arrangement can be visualized with different colors (for example from red for a low state to green for a high state) and/or with different identifications (for example with numerical values, inscriptions and/or symbols such as emoticons or the like).

In the user query routine the input of the state can be effected by means of the user interface 13 on the basis of tapping a selection field, for example on a touchscreen. Input of the state can likewise be provided by way of shifting a selection field, for example by means of a drag-and-drop functionality. Preferably, an input by way of shifting a selection controller is possible, the user shifting a controller along a scale for the state, for example. Furthermore, a free text input and/or a voice input of the state are/is likewise conceivable.

According to a further teaching that is accorded independent importance, the above-described labeling system for labeling individual packs is claimed as such. The labeling system comprises a labeling device 1, in particular a price labeling device, the labeling device 1 being equipped with a feed assembly 2 for transporting respective packs, with a dispensing assembly 4 for dispensing a label detachable from a material strip 5 and with an application assembly 6 for applying the dispensed label to the respective pack as functional units, at least one of these functional units or all of these functional units in each case comprising a sensor assembly 8, 9, 10, the labeling device 1 comprising a control assembly 11 which, in a labeling routine, controls the functional units for the purpose of labeling the individual packs, and the labeling system comprising a user interface 13.

What is essential here is that the labeling system is configured for carrying out the method according to the proposal. In particular, the control assembly 11 is configured to control the functional units for the purpose of carrying out the labeling routine, to carry out the user query routine according to the proposal, and to communicate a message relating to the input state to a superordinate control system 14 configured as external to the labeling system. The control assembly 11 is configured accordingly for being connected to a control system 14 for the communication, for example by providing the control assembly 11 with a network interface. In this respect, reference may be made to all explanations concerning the method according to the proposal.

According to a further teaching that is likewise accorded independent importance, a system having a control assembly 11 for a labeling system and a control system 14 which is configured as external to the labeling system and is superordinate to the control assembly 11 are claimed as such, the control assembly 11 being configured for controlling the functional units of the labeling system for labeling the individual packs in a labeling routine in accordance with a control specification, the control assembly 11 being configured to be connected to a user interface 13 of the labeling system in terms of control engineering.

What is essential in this case is that the control assembly 11 carries out a user query routine in which a user is requested by means of the user interface 13 to input a state relating to a functional aspect of the labeling system and the state thereupon input by the user is captured by the control assembly 11, that the control assembly 11 compares the input state with a predefined state and, in the event of a deviation of the input state from the predefined state, initiates a reaction routine in which the control assembly 11 communicates a message relating to the input state to the control system 14, and in which the control specification is modified depending on the input state. In this respect, too, reference may be made to the explanations concerning the method according to the proposal. The above-described labeling system according to the proposal preferably comprises the control assembly 11 of the system.

Particularly preferably, the control assembly 11 and the control system 14 in each case comprise a memory 28, 29 having program instructions and in each case at least one processor 30, 31 for executing the program instructions, the memories 28, 29 and the program instructions being configured, together with the processors 30, 31, to control the system for carrying out the method according to the proposal.

The memory 28, 29 preferably comprises a nonvolatile memory for the program instructions, for example a flash memory, an EEPROM memory, a magnetic memory and/or an optical memory. The memory 28, 29 can furthermore be equipped with a main memory, preferably a random access memory (RAM) or the like. The processor 30, 31 preferably comprises a microprocessor, a digital signal processor and/or an application-specific integrated circuit.

Moreover, according to a next teaching, which is likewise accorded independent importance, a computer program comprising program instructions which cause the processors 30, 31 of the system according to the proposal to carry out the method according to the proposal when the computer program runs on the processors 30, 31 is claimed as such. In this respect, too, reference may be made to the above explanations concerning the method according to the proposal. The computer program is preferably stored as a computer program product on a nonvolatile memory.

The invention claimed is:

1. A method for operating a labeling system that includes, as functional units
    a labeling device equipped with a feeder for transporting individual packs to be labeled,
    a dispenser for dispensing a label detachable from a material strip, and
    an applicator for applying a dispensed label to a respective one of the individual packs,
    wherein one or more of the functional units includes a sensor assembly for determining sensor data relating to a labeling routine,
    wherein the labeling system further includes a control assembly, which in the labeling routine, controls the functional units for the purpose of individually labeling the packs in accordance with a control specification, and
    wherein the labeling system further includes a user interface,
the method comprising:
    carrying out a user query routine by means of the control assembly, wherein in said user query routine, a user, by means of the user interface, is requested to input a state relating to a functional aspect of the labeling system and the state inputted by the user is captured by the control assembly as an input state;
    comparing the input state by means of the control assembly with a predefined state to determine whether the input state deviates from the predefined state; and
    when the input state is determined to deviate from the predefined state, initiating a reaction routine by means of the control assembly in which a message regarding the input state is communicated by means of the control assembly to a control system which is configured as external to the labeling system and is superordinate to the control assembly, and in which the control specification is modified on the basis of the input state.

2. The method as claimed in claim 1, wherein, in the reaction routine, the control specification is modified depending on whether the input state falls below or exceeds the predefined state.

3. The method as claimed in claim 1, wherein, in the reaction routine, by means of the control assembly and/or by means of the control system, a degree of the deviation of the input state from the predefined state is determined and the modification of the control specification is performed depending on the degree of the deviation.

4. The method as claimed in claim 3, wherein the degree of the deviation of the input state from the predefined state is checked by means of the control assembly and/or by means of the control system in the reaction routine for satisfaction of a predefined urgency criterion, and wherein the reaction routine is carried out depending on the satisfaction of the predefined urgency criterion.

5. The method as claimed in claim 1, wherein an assignment of at least one of the functional units to the input state is provided on a basis of a functional aspect, or at least one of the functional units is assigned to the input state by means of the control assembly and/or by means of the control system in the reaction routine, and wherein the control specification is modified for the functional aspect.

6. The method as claimed in claim 5, wherein the labeling system comprises a plurality of functional units for carrying out at least one labeling function and the control specification is modified in the reaction routine such that the at least one labeling function is taken over by a different one of the plurality of functional units and/or wherein a plurality of functional resources are provided for the at least one labeling function and the control specification is modified in the reaction routine for the at least one labeling function such that the labeling routine is carried out using a different one of the plurality of functional resources.

7. The method as claimed in claim 1, wherein the control specification comprises a speed specification for the individual packs to be labeled, and wherein the speed specification is modified in the reaction routine.

8. The method as claimed in claim 7, wherein, when the input state falls below the predefined state, the speed specification is reduced compared with a predefined speed specification appertaining to normal operation, or, when the input state exceeds the predefined state, the speed specification is increased compared with a predefined speed specification appertaining to normal operation.

9. The method as claimed in claim 1, wherein, at least partially by means of the control system, the control specification is modified such that help information relating to the use of a tool and/or a replacement part is generated in the reaction routine by means of the control system on the basis of the input state and the help information is output via the user interface to maintenance personnel for the labeling system.

10. The method as claimed in claim 1, wherein, in the reaction routine, the control assembly generates a notification to a manufacturer of the labeling system depending on the input state.

11. The method as claimed in claim 1, wherein modification of the control specification is dependent on the sensor data relating to the labeling routine.

12. The method as claimed in claim 11, wherein modification of the control specification is dependent on temporally preceding sensor data stored in the control system.

13. The method as claimed in claim 11, wherein modification of the control specification by means of the control system is predefined depending on sensor data relating to the labeling routine from a plurality of labeling systems.

14. The method as claimed in claim 1, wherein a forecast routine is carried out in the reaction routine by means of the control system, and wherein in the forecast routine a forecast is generated for need of repair and/or maintenance of one or more of the functional units.

15. The method as claimed in claim 1, wherein, by means of the control system, a learning routine is carried out in which, depending on a temporal sequence of states input in user query routines including at least one state input subsequent to a reaction routine, modification of the control specification is carried out in the learning routine such that when the input state is determined to deviate from the predefined state, the probability of maintaining the predefined input state in a subsequent user query routine is increased.

16. The method as claimed in claim 15, wherein, in the learning routine, the modification of the control specification is carried out in the respective user query routine further depending on the respective control specifications of the labeling device, on sensor data relating to the individual packs and/or on environmental parameters of the labeling system.

17. The method as claimed in claim 1, wherein, in the user query routine, the user is requested by means of the user interface to select the state from a compilation of selectable states.

18. The method as claimed in claim 17, wherein the compilation of selectable states represents a rising scale from a low to a high state.

19. The method as claimed in claim 1, wherein, in the reaction routine, the user is requested by means of the user interface to modify the control specification manually for at least one of the functional units.

20. The method as claimed in claim 1, wherein the input state deviates from the predefined state, a plausibility check of the input state with regard to a presence of at least one predetermined plausibility criterion is carried out by means of the control assembly and a reaction routine is initiated only in the event of a successful plausibility check.

21. The method as claimed in claim 1, wherein the labeling device includes a printer assembly for printing on the label detachable or detached from the material strip, a label transporter for transporting the label from the dispenser to the printer assembly and/or to the applicator, a weighing assembly for weighing the respective pack and/or a pack recognition assembly as a further functional unit or as further functional units having a respective sensor assembly.

22. The method as claimed in claim 1, wherein the input state is input by means of an input assembly and an output assembly of the user interface.

23. The method as claimed in claim 1, wherein the input state is input by means of a user interface embodied as a mobile device.

24. The method as claimed in claim 1, wherein carrying out the user query routine is initiated in a time-controlled manner and/or wherein carrying out the user query routine is initiated by means of the control assembly in response to one or more predefined user actions selected from the group consisting of maintenance, renovation and repair of the labeling system.

25. The method as claimed in claim 1, wherein, in the user query routine, the state relating to the functional aspect which the user is requested to input relates to brightness, contrast, print quality and/or alignment of a printed image on the labels, relates to alignment, position and/or adhesion of the labels on the individual packs, and/or relates to productivity of the labeling system.

26. The method as claimed in claim 1, wherein, in the user query routine, the user is requested to input a plurality of states by way of a hierarchy of queries, wherein at least one subordinate query is assigned to at least one superordinate query in the hierarchy of queries.

27. The method as claimed in claim 26, wherein firstly the at least one superordinate query is effectuated and when the input state deviates from the predefined state in the superordinate query the at least one subordinate query is effectuated.

28. The method as claimed in claim 26, wherein the hierarchy of queries in the user query routine is predefined on the basis of a previously input state.

29. The method as claimed in claim 1, wherein, in the user query routine, the user is requested to input one state or a plurality of states regarding one functional aspect, a plurality of functional aspects or all functional aspects from an indicated selection of functional aspects.

30. The method as claimed in claim 1, wherein, in the user query routine, for the purpose of inputting the state, a compilation of selectable states is output on the basis of an arrangement of selection fields by means of the user interface.

31. The method as claimed in claim 1, wherein, in the user query routine, the input of the state is effectuated by means of the user interface on the basis of tapping a selection field, shifting a selection field and/or a selection controller, a free text input and/or a voice indication.

32. The method as claimed in claim 1, wherein the control specification comprises a specification relating to a cyclic or continuous operation of the labeling device for the labeling routine.

33. The method as claimed in claim 1, wherein, at least partially by means of the control system, the control specification is modified such that help information relating to the use of a tool and/or a replacement part is generated in the reaction routine by means of the control system on the basis of the input state and the help information is output by means of the control system to maintenance personnel for the labeling system.

34. The method as claimed in claim 1, wherein, at least partially by means of the control system, a modification of the control specification is requested by a user in a user query routine such that help information relating to the use of a tool and/or a replacement part is generated in the reaction routine by means of the control system on the basis of the input state and the help information is output via the user interface to maintenance personnel for the labeling system.

35. The method as claimed in claim 1, wherein, at least partially by means of the control system, a modification of the control specification is requested by a user in a user query routine such that help information relating to the use of a tool and/or a replacement part is generated in the reaction routine by means of the control system on the basis of the input state and the help information is output by means of the control system to maintenance personnel for the labeling system.

36. A labeling system for labeling individual packs, the labeling system comprising, as functional units:
a labeling device equipped with a feeder for transporting the individual packs;

a dispenser for dispensing a label detachable from a material strip; and an applicator for applying a dispensed label to a respective one of the individual packs;

wherein at least one of the functional units or all of the functional units comprise a sensor assembly for determining sensor data relating to a labeling routine, wherein the labeling system further comprises a control assembly, which, in the labeling routine, controls the functional units for the purpose of labeling the individual packs, wherein the labeling system further comprises a user interface, and wherein the labeling system is configured to perform a method as claimed in claim 1.

37. A system comprising a labeling system as claimed in claim 36 and a control system which is configured as external to the labeling system and is superordinate to the labeling system, wherein the control assembly is configured to control the functional units of the labeling system for labeling the individual packs in the labeling routine in accordance with the control specification, and wherein the control assembly is configured to be connected to the user interface of the labeling system, wherein the control assembly is configured to carry out the user query routine in which the user, by means of the user interface of the labeling system, is requested to input the state relating to the functional aspect of the labeling system and the state thereupon input by the user is captured by the control assembly, and wherein the control assembly is configured to compare the input state with the predefined state and, when the input state is determined to deviate from the predefined state, is configured to carry out the reaction routine in which the control assembly communicates the message relating to the input state to the control system, and in which the control specification is modified depending on the input state.

38. The system as claimed in claim 37, wherein the control assembly and the control system each comprise a memory having program instructions and each comprise at least one processor for executing the program instructions, and wherein the memories and the program instructions are configured, together with the processors, to control the system for carrying out the method.

* * * * *